(12) United States Patent
Kapur (10) Patent No.: US 8,983,923 B2
(45) Date of Patent: Mar. 17, 2015

(54) SYSTEM AND METHOD FOR THE RETRIEVAL AND DISPLAY OF SUPPLEMENTAL CONTENT

(75) Inventor: Shyam Kapur, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1171 days.

(21) Appl. No.: 11/626,903

(22) Filed: Jan. 25, 2007

(65) Prior Publication Data

US 2008/0183742 A1    Jul. 31, 2008

(51) Int. Cl.
*G06F 17/30* (2006.01)
*G06Q 30/02* (2012.01)

(52) U.S. Cl.
CPC .......... *G06F 17/30864* (2013.01); *G06Q 30/02* (2013.01)
USPC ........................................ 707/706

(58) Field of Classification Search
CPC ................................................ G06F 17/30864
USPC .............. 707/708, 709, 706; 705/14; 709/219
See application file for complete search history.

(56) References Cited

U.S. PATENT DOCUMENTS

| | | | |
|---|---|---|---|
| 2005/0283469 A1* | 12/2005 | Veteska et al. | 707/3 |
| 2006/0287919 A1* | 12/2006 | Rubens et al. | 705/14 |
| 2007/0055748 A1* | 3/2007 | Kim et al. | 709/219 |
| 2007/0130203 A1* | 6/2007 | Gulli et al. | 707/104.1 |

* cited by examiner

*Primary Examiner* — Huawen Peng
(74) *Attorney, Agent, or Firm* — James J. DeCarlo; Greenberg Traurig, LLP (57) ABSTRACT

The present invention is directed towards systems and methods for identifying and displaying supplemental content associated with one or more advertisements responsive to a user query. The method of the present invention comprises identifying one or more advertisements responsive to a user query. One or more terms are extracted from the one or more advertisements identified as responsive to the user query. Supplemental content associated with the one or more advertisements is retrieved through use of the one or more extracted terms, and a display is generated comprising the one or more advertisements identified as responsive to the user query and the supplemental content associated with the one or more advertisements.

24 Claims, 3 Drawing Sheets

SYSTEM AND METHOD FOR THE RETRIEVAL AND DISPLAY OF SUPPLEMENTAL CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The World Wide Web may be thought of as a distributed data store comprising billions of data content items through the Internet. Search engines are commonly used to search the content items available on computer networks, such as the World Wide Web, to enable users to locate content items of interest. A typical search engine is capable of accessing the plurality of web pages, hypertext documents, and other content items from the Internet or other network through use of a crawler.

To use search engine, a user of a client device typically enters one or more search terms or keywords comprising a query. The search engine thereafter identifies one or more content items responsive to the one or more search terms or keywords comprising a received query. The content items identified by the search engine may be combined to form a result set that is displayed to the user with which the query originated.

The content items identified by a search engine as responsive to a query received from a user may include one or more advertisements. Advertisements are commonly used on the Internet to promote various products and services. Advertisements may comprise banner ads, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, redirecting the user to a website providing the advertised product or service.

The one or more advertisements displayed to a user of a client device in response to a query are associated with one or more advertisers. The one or more advertisers associated with the advertisements may specify the keywords in response to which one or more advertisements are to be displayed. For example, an advertiser may specify that a given advertisement associated with computers is to be displayed in response to the keywords "computer," "desktop," or "laptop." A query comprising one or more of the keywords specified by the advertiser may result in the display of the advertiser's advertisement.

A given advertisement displayed to a user of a client device may be associated with a category or topic for which the advertiser may have additional content that the advertiser wishes to display to a given user. For example, a given query received from a user of a device may comprise the terms "car rentals in New York City." An advertisement identified as responsive to the query may contain images, text, etc., responsive to the query. In addition to the images, text, etc., contained within the advertisement, the advertiser may have additional content that the advertiser wishes to display to the user, such as promotional material, additional images, video clips, coupons, etc.

While techniques exist for displaying advertisements associated with advertiser specified keywords that match or are similar to the one or more search terms comprising a user query, current techniques fail to provide for the retrieval and display supplemental content that an advertiser may wish to display to users in conjunction with a given advertisement. Accordingly, systems and methods are needed to provide for the identification, retrieval, and display of supplemental content associated with a given advertisement displayed in response to a query received from a user of a client device.

SUMMARY OF THE INVENTION

The present invention is directed towards systems and methods for identifying and displaying supplemental content associated with one or more advertisements responsive to a user query. The method of the present invention comprises identifying one or more advertisements responsive to a user query. According to one embodiment, identifying one or more advertisements responsive to a user query comprises identifying one or more terms comprising a user query and identifying one or more advertisements associated with one or more advertiser specified keywords matching the one or more terms comprising the user query.

One or more terms are extracted from the one or more advertisements identified as responsive to the user query. According to one embodiment, the one or more terms are extracted from text contained within the advertisement. According to another embodiment, the one or more terms are extracted from source code with which the advertisement is associated.

Supplemental content associated with the one or more advertisements is retrieved through use of the one or more extracted terms. According to one embodiment, the advertiser associated with a given advertisement is identified, and supplemental content is retrieved from the identified advertiser associated with the one or more terms extracted from the advertisement. The supplemental content retrieved may comprise video content, audio content, one or more images, or textual content. Furthermore, supplemental content may be associated with terms from other advertisements, even algorithmic search results, etc.

A display is generated comprising the one or more advertisements identified as responsive to the user query and the supplemental content associated with the one or more advertisements. According to one embodiment, the one or more advertisements and the supplemental content associated with the one or more advertisements are combined. Combining an advertisement with the supplemental content associated with the advertisement may comprise generating a link to the supplemental content associated with the advertisement and displaying the advertisement in conjunction with the generated link. Combining an advertisement with the supplemental content with which the advertisement is associated may also comprise generating a pop-up containing the supplemental content associated with the advertisement. Alternatively, or in conjunction with the foregoing, a modified advertisement is generated containing the advertisement and the supplemental content associated with the advertisement.

The present invention is further directed towards a system for identifying and displaying supplemental content associated with one or more advertisements responsive to a user query. The system of the present invention comprises an extraction component operative to extract one or more terms from one or more advertisements identified as responsive to a user query. According to one embodiment, the extraction component is operative to extract one or more terms from text contained within an advertisement. According to another embodiment, the extraction component is operative to extract one or more terms associated with one or more images, video content, or audio content. The extraction component is further operative to identify an advertiser associated with a given advertisement.

A search component is operative to identify supplemental content associated with one or more terms extracted from the one or more advertisements identified as responsive to the user query. According to one embodiment, the search component is operative to locate supplemental content from the advertiser identified as associated with a given advertisement, retrieve the supplemental content associated with the one or more terms extracted from the advertisement.

A display component is operative to generate a display comprising the one or more advertisements identified as responsive to a user query and the supplemental content associated with the one or more advertisements. According to one embodiment, the display component is operative to combine a given advertisement with the supplemental content associated with the advertisement. The display component may generate a link to the supplemental content associated with the advertisement, and display the advertisement in conjunction with the link to the supplemental content associated with the advertisement. Alternatively, or in conjunction with the foregoing, the display component may generate a pop-up containing the supplemental content associated with a given advertisement. According to another embodiment, the display component generates a modified advertisement containing the advertisement and the supplemental content associated with the advertisement.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
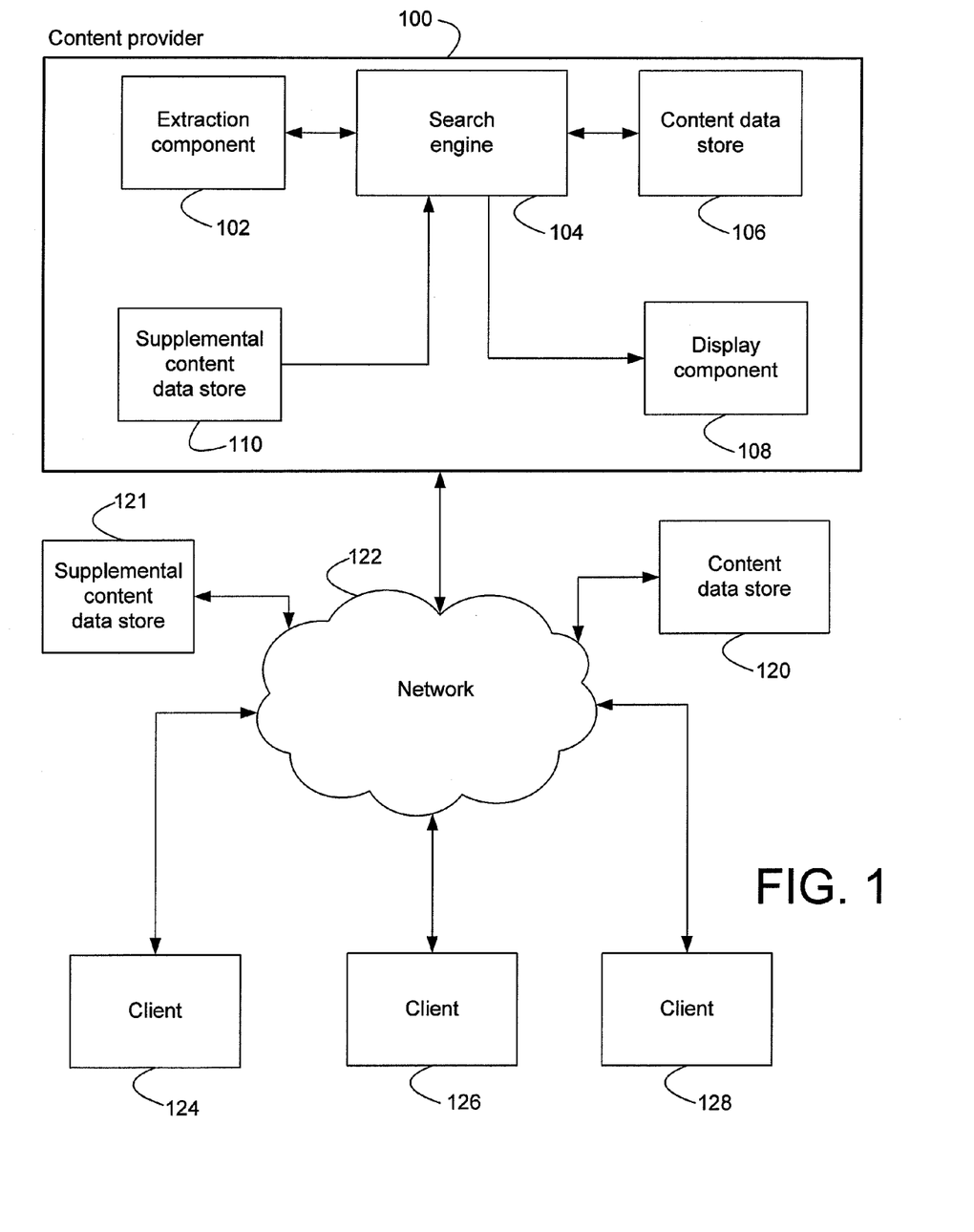
FIG. 1 is a block diagram illustrating one embodiment of a system for identifying supplemental content associated with one or more advertisements according to one embodiment of the present invention.

FIG. 1 presents a block diagram depicting one embodiment of a system for identifying and displaying supplemental content associated with one or more advertisements. According to the embodiment of FIG. 1, client devices 124, 126, and 128 are communicatively coupled to a network 122, which may include a connection to one or more local or wide area networks, such as the Internet. According to one embodiment, a client device 124, 126, and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Users of client devices 124, 126, and 128 communicatively coupled to the network 122 may submit search queries, comprising one or more terms, to a content provider 100. A typical query received from a user of a client device 124, 126, and 128 has one or more terms. For example, the query "wireless notebook computer" contains three terms and may be referred to as a three-term query. Similarly, queries containing only one term are referred to as one-term queries, queries containing two terms are two-term queries, etc. A space or other delimiter character may be used to identify the individual terms comprising a given query.

A search engine 104 at the content provider 100 may utilize the one or more terms comprising a given query to identify one or more advertisements that are responsive to the one or more terms comprising the query. According to one embodiment, the search engine 104 at the content provider 100 uses communication pathways that the network 122 provides to access one or more remote 120 or local 106 content data stores to locate content items that are responsive to a given query received from a user of a client device 124, 126, and 128. Local 106 and remote 120 content data stores may comprise accessible memory structures such as a database, CD-ROM, tape, digital storage library, etc., and may be implemented as databases, file systems, or any other type of storage structures capable of providing for the retrieval and storage of a variety of advertisements associated with one or more advertisers.

The one or more advertisements identified by the search engine 104 as responsive to a query received from a user of a client device 124, 126, and 128 are delivered to an extraction component 102 at the content provider 100. The extraction component 102 is operative to extract one or more terms or phrases that may appear in a given advertisement, as well as identify an advertiser associated with a given advertisement.

According to one embodiment of the invention, the extraction component 102 is operative to utilize a units data store (not illustrated) to identify one or more terms or phrases in a given advertisement. For example, a given advertisement identified by the search engine 104 as responsive to a query received from a user of a client device 124, 126, and 128 comprising the terms "laptop computers" may comprise an advertisement directed towards selling computers. The advertisement may contain a variety of content, including but not limited to, images, video content, audio content, and text. The text may include terms and phrases, such as "discount on laptop computers," "on sale now—desktop computers." The advertisement may be delivered to the extraction component 102, which may extract the one or more terms or phrases that appear in the advertisement. For example, with reference to a units data store, the extraction component 102 may identify the advertisement as containing the terms or phrases "laptop computers" and "desktop computers." The one or more terms or phrases maintained in the units data store may comprise one or more terms or phrases that commonly appear in search queries, or one or more terms or phrases that commonly appear in web pages, documents, advertisement etc., or one or more common terms or phrases as identified by a human editor.

The one or more terms or phrases extracted by the extraction component 102 from a given advertisement, as well as the advertiser identified by the extraction component 102 as associated with the advertisement, are delivered to the search engine 104. The search engine thereafter utilizes the one or more extracted terms or phrases and the advertiser associated with a given advertisement to perform a search of one or more remote 121 or local 110 supplemental content data stores. Local 110 and remote 121 supplemental content data stores may comprise accessible memory structures such as a database, CD-ROM, tape, digital storage library, etc., and may be implemented as databases, file systems, or any other type of storage structures capable of providing for the retrieval and storage of a variety of content associated with one or more advertisers.

The supplemental content maintained in the local 110 and remote 121 supplemental content data stores may include, but is not limited to, video, audio, or textual content. Additionally, an advertiser associated with supplemental content maintained in the local 110 and remote 121 supplemental content data stores may specify the terms or phrases in response to which the supplemental content is to be displayed.

For example, a given advertiser may have several advertisements directed towards selling computer products. Periodically, the advertiser may wish to advertise promotions or display coupons offering discounts on one or more computer products. Accordingly, the advertiser may add promotional material or one or more coupons to one or more of the supplemental content data stores, 110 and 121. A user of a client device 124, 126, and 128 may generate a query comprising the terms "discount computers." The search engine 104 at the content provider 100 may select an advertisement from the advertiser and deliver the selected advertisement to the extraction component 102. The extraction component may thereafter extract the terms "discount laptops" and "sale on computers" from the selected advertisement, as well as identify the advertiser with which the selected advertisement is associated.

The extraction component 102 may deliver the extracted terms "discount laptop" and "sale on computers," as well as the identified advertiser, to the search engine, which may perform a search of the local 110 and remote 121 supplemental content data stores to identify any supplemental content responsive to the extracted terms. According to another embodiment of the invention, the search engine at the content provider 104 may perform a search of one or more content data stores (not illustrated) associated with a given advertiser. The search engine 104 may identify and retrieve one or more coupons or other promotional content responsive to the extracted terms or phrases that the advertiser wishes to display in conjunction with the selected advertisements.

The one or more advertisements identified as responsive to a query received from a user of a client device 124, 126, and 128, as well as the supplemental content associated with the one or more identified advertisements, are delivered to a display component 108 at the content provider 100. The display component 108 is operative to generate a display of the one or more advertisements identified as responsive to a query received from a user of a client device 124, 126, and 128, as well as the supplemental content associated with the one or more advertisements. For example, the display component 108 may generate a display in which the one or more advertisements responsive to a query received from a user of a client device 124, 126, and 128 are displayed in conjunction with links, such as a Uniform Resource Locators ("URL"), which when selected by a user of a client device 124, 126, and 128 display the supplemental content associated with a given advertisement.

Alternatively, or in conjunction with the foregoing, the display component 108 may generate a display in which the one or more advertisements responsive to a query received from a user of a client device 124, 126, and 128 are combined with the supplemental content associated with the one or more advertisements. Those of skill in the art recognize the variety of techniques that may be used to display one or more advertisements responsive to a query received from a user of a client device 124, 126, and 128 in conjunction with supplemental content associated with the one or more advertisements.

The one or more advertisements identified as responsive to a query received from a user of a client device 124, 126, and 128, as well as the supplemental content associated with the one or more advertisements, are thereafter delivered to the client device with which a query originated 124, 126, and 128. The user of the client device 124, 126, and 128 with which the query originated may review the supplemental content associated with the one or more displayed advertisements and select one or more of the advertisements, which may redirect the user to the advertiser web site (not illustrated) associated with the selected advertisement.

Figure 2:
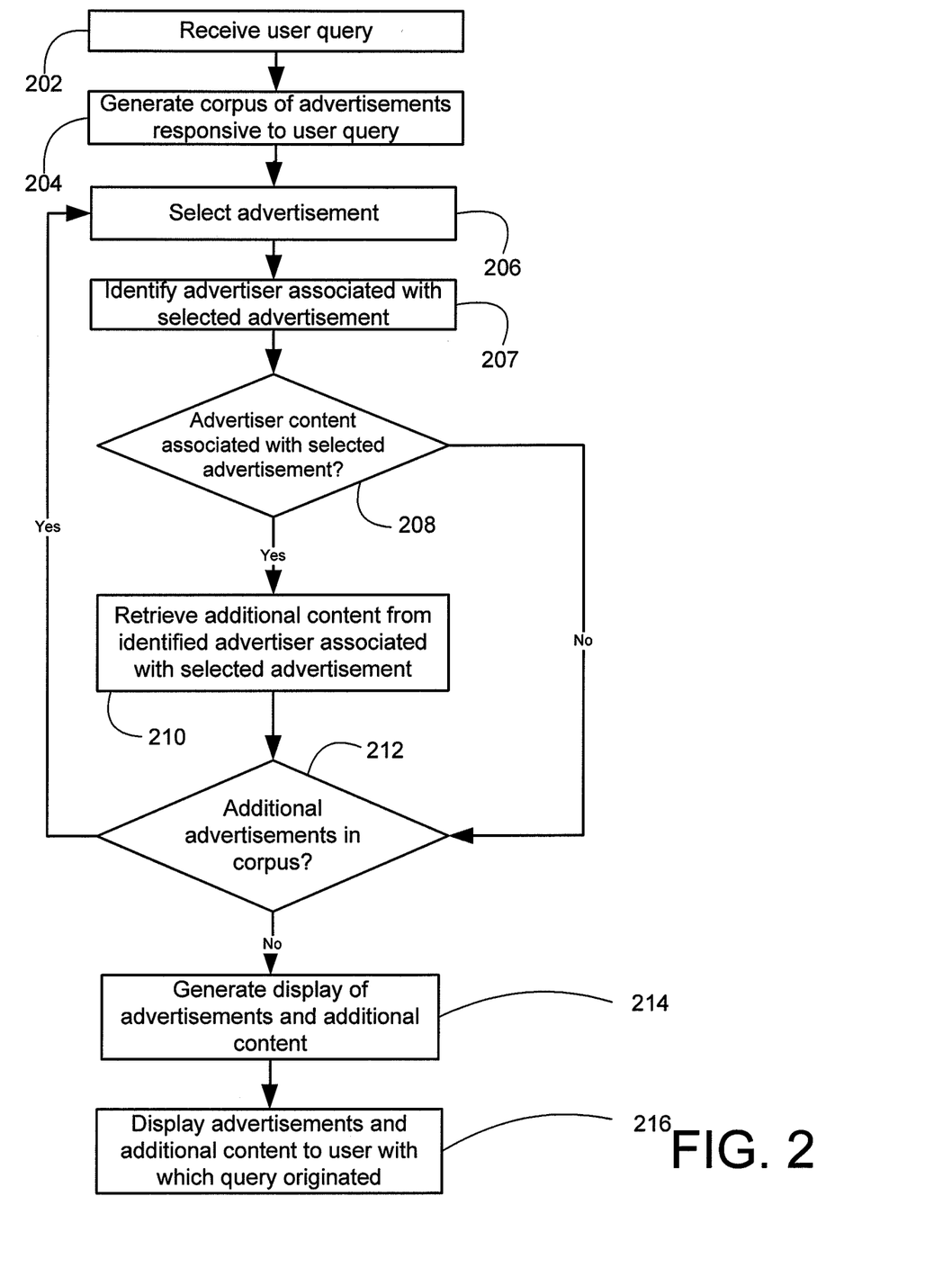
FIG. 2 is a flow diagram illustrating one embodiment of a method for retrieving and displaying supplemental advertiser content associated with one or more advertisements according to one embodiment of the present invention.

FIG. 2 is a flow diagram illustrating one embodiment of a method for retrieving and displaying supplemental advertiser content associated with one or more advertisements. According to the embodiment illustrated in FIG. 2, a user query comprising one or more terms is received from a given user, step 202. A search is performed to identify a corpus of advertisements responsive to the one or more terms comprising the received user query. For example, advertisements may be associated with one or more advertiser specified keywords, which may identify the terms or phrases in response to which the advertisements are to be displayed to a given user in response to a query containing one or more of the advertiser specified keywords.

An advertisement is selected from among the one or more advertisements identified as responsive to the received query, step 206. As previously described, the one or more advertisements comprising the corpus of advertisements responsive to the received user query may be associated with one or more advertisers. Accordingly, the advertiser associated with the selected advertisement is identified, step 207. Although the present embodiment illustrates the presentation of supplemental information in conjunction with an advertisement, those of skill in the art recognize that the systems and methods of the present invention are applicable for use in conjunction algorithmic search results, or any listing or link on a given web page.

A check is thereafter performed to determine whether supplemental content associated with the selected advertisement and the identified advertiser is available, step 208. For example, a search of the identified advertiser's one or more content data stores may be performed to locate supplemental content associated with the selected advertisement. The decision block at step 208 may determine the availability of supplemental content on the basis of a number of factors including, but not limited to, actions or behavior based attributes of the user, demographic information, user location ("geo-targeting"), past query history of the user, the client device that the user is utilizing (e.g., cell phone versus PC).

If supplemental content is available, the supplemental content is retrieved, step 210. In addition to advertiser provided supplemental content, supplemental content may include third-party information, such as ranking information, ratings information and reviews, each of which may be user contributed. If no advertiser supplemental content is available, or after the advertiser supplemental content has been retrieved, a check is performed to determine whether there are one or more advertisements in the corpus of advertisements that require analysis, step 212. If one or more additional advertisements require analysis, an advertisement is selected from among the corpus of advertisements, step 206.

After an analysis has been performed on the one or more advertisements in the corpus, a display is generated containing the one or more advertisements comprising the corpus of advertisements identified as responsive to the received query, as well as any supplemental content associated with the one or more advertisements, step 214. The display that is generated is thereafter delivered to the user with which the query originated, step 216.

Although the embodiment of FIG. 2 illustrates the presentation to supplemental information in conjunction with advertisements and in response to a user query, embodiments of the invention are operative to generate supplemental information at any time in any given context. For example, supplemental information may be presented to the user in response to an action (mouse over, mouse click, etc.) or absence of an action. Furthermore, embodiments of the invention provide for the optimization of supplemental information for a given user, which may include the context of the user and a time. For example, supplemental information that the system selects and presents may be a function of current events at a given point in time, supplemental information that is appropriate in a given season or appropriate for a given day of the week, week of the month, etc.

Figure 3:
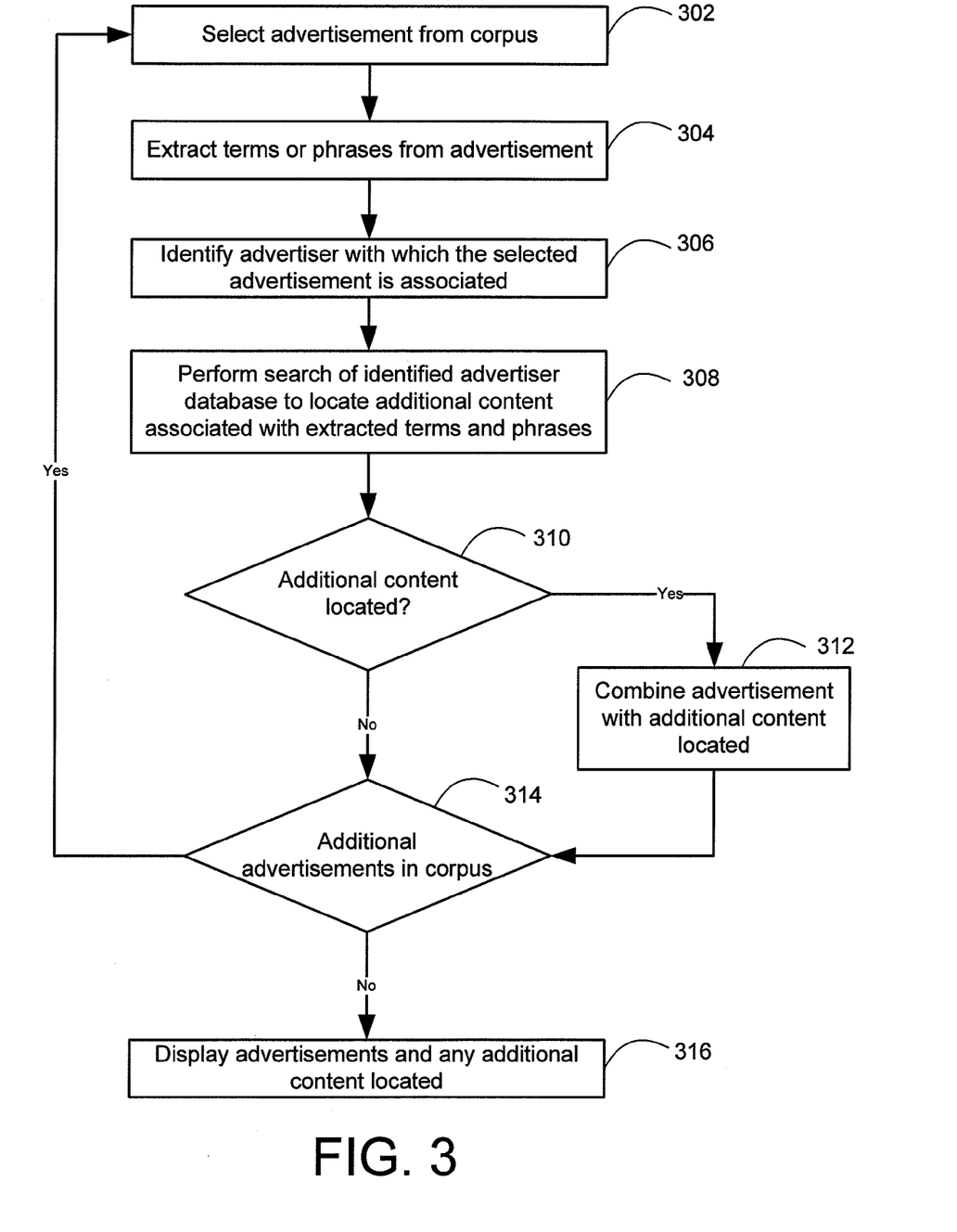
FIG. 3 is a flow diagram illustrating one embodiment of a method for identifying supplement content associated with a given advertisement according to one embodiment of the present invention.

FIG. 3 is a flow diagram illustrating one embodiment of a method for identifying supplemental content associated with a given advertisement. According to the embodiment illustrated in FIG. 3, an advertisement is selected from a corpus of advertisements comprising one or more advertisements identified as responsive to a user query, step 302.

As previously described, an advertisement may contain a variety of content, including but not limited to, images, audio, video, and textual content. According to the embodiment illustrated in FIG. 3, the one or more terms or phrases are extracted from the advertisement, step 304. Extracting terms or phrases from a given advertisement may comprise extracting one or more terms or phrases from the textual content contained within the advertisement. For example, one or more terms or phrases may be extracted from the title of the advertisement. Similarly, one or more terms or phrases may be extracted from textual content displayed within the advertisement.

Extracting terms or phrases from a given advertisement may also comprise identifying terms or phrases associated with images, audio, or video content contained within the advertisement. For example, a given advertisement may be generated through use of the Hypertext Markup Language ("HTML"). The HTML code of a given advertisement may contain references to images that are to be displayed within the advertisement. For example, the HTML code of a given advertisement may contain the following line of code: <img src="laptop_computer.jpg" width="100" height="200"></a>. Those of skill in the art recognize that the foregoing HTML code references an image, specifically, the image named "laptop_computer.jpg." Extraction of terms and phrases from a given advertisement may thus comprise identifying the name or other identifier associated with a given image, or other content item, such as video or audio content, contained within the HTML code of a given advertisement. For example, with reference to the foregoing HTML code, the phrase "laptop computers" may be extracted from the HTML code of the advertisement, indicating that the advertisement may be associated with "laptop computers."

The advertiser associated with the selected advertisement is identified, step 306, and a search is performed to identify supplemental advertiser content associated with the extracted terms and phrases, step 308. The supplemental content associated with the extracted terms and phrases from a given advertisement may include, but is not limited to, audio content, video content, images, and text that an advertiser wishes to display in conjunction with one or more advertisements.

According to one embodiment, a search engine that displays advertisements in response to a query received from a given user may place size restrictions upon the advertisements that advertisers display in response to user queries. Accordingly, advertisers may be forced to exclude certain content that may relevant to a given advertisement in order to comply with the size restrictions imposed by the search engine. Similarly, advertisers may periodically have promotions or discounts that are only applicable during certain time periods. Advertisers may thus wish to display content associated with such promotions or discounts only during the time period in which the promotions or discounts are applicable.

Advertisers may specify supplemental content that is to be displayed in conjunction with one or more advertisements. According to one embodiment, advertisers may specify terms or phrases that may be extracted from advertisements in response to which supplemental content is to be shown. For example, the phrase "airline tickets" may be extracted from a given advertisement associated with a given advertiser. A search of the advertiser's supplemental content data stores may performed to identify any supplemental content that the advertiser wishes to be displayed in conjunction with an advertisement containing the phrase "airline tickets," e.g., information regarding specific flights that might be of interest to the user.

A check is performed to determine whether any supplemental content is identified for the selected advertisement, step 310. If supplemental content is identified, the identified supplemental content, and the advertisement with which the supplemental content is associated, may be combined, step 312. For example, a modified advertisement may be generated, wherein the modified advertisement contains both the content from the selected advertisement, as well as the supplemental content associated with the selected advertisement. Similarly, combining an advertisement with supplemental content may comprise generating a pop-up that contains the supplemental content that is displayed upon selection of the advertisement with which the supplemental content is associated. Alternatively, or in conjunction with the foregoing, combining the advertisement with the supplemental content may comprise generating a link to be displayed in conjunction with the advertisement, wherein selection of the link results in the display of the supplemental content associated with the advertisement.

After the selected advertisement and any available supplemental content associated with the selected advertisement have been combined, or if no supplemental content was located for the selected advertisement, a check is performed to determine whether one or more additional advertisements require analysis, step 314. If one or more additional advertisements require analysis, an advertisement is selected from among the one or more advertisements comprising the corpus of advertisements identified as responsive to a query received from a given user, step 302.

After the one or more advertisements comprising the corpus of advertisements have been analyzed, the one or more advertisements, and any supplemental content associated with the one or more advertisements are displayed to the user with which the query originated, step 316. The user with which the query originated may review the advertisements and supplemental content associated with the advertisements, as well as select one or more of the advertisements or supplemental content in order to be redirected to the advertiser website with which the selected advertisement or supplemental content is associated.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A method for identifying and displaying supplemental content associated with one or more advertisements responsive to a user query in a computerized system, the method comprising:

electronically identifying one or more advertisements from an advertiser responsive to a user query;

analyzing a given one of the one or more advertisements;

electronically extracting one or more terms from display content of the given one of the one or more advertisements, the given one of the one or more advertisements, from which the one or more terms are extracted, being capable of being displayed in a search results display responsive the user query;

generating a supplemental query using the-one or more terms extracted from the given one of the one or more advertisements;

electronically retrieving supplemental content from the advertiser of the given one of the one or more advertisements responsive to the supplemental query from a supplemental data store component, the supplemental content associated with the given one of the one or more advertisements from the advertiser of the given one of the one or more advertisements and including additional advertising content available from the advertiser of the given one of the one or more advertisements for a limited time period and based on a context of a querying user; and electronically generating a search results display comprising a listing of search results responsive to the query, the given one of the one or more advertisements identified as responsive to the user query and the supplemental content associated with the given one of the one or more advertisements, the supplement content being visible to the querying user upon a mouse over of the given one of the one or more advertisements, a selection of the given one of the one or more advertisements, or an inactivity of the querying user.

2. The method of claim 1 wherein electronically identifying one or more advertisements responsive to a user query comprises:
   identifying one or more terms comprising a user query; and
   identifying one or more advertisements associated with one or more advertiser specified keywords matching the one or more terms comprising the user query.

3. The method of claim 1 wherein electronically extracting one or more terms from an advertisement comprises extracting one or more terms from text contained within the advertisement.

4. The method of claim 1 wherein electronically extracting one or more terms from an advertisement comprises extracting one or more terms from source code with which the advertisement is associated.

5. The method of claim 1 wherein electronically retrieving supplemental content associated with an advertisement comprises:
   identifying an advertiser associated with a given advertisement; and
   retrieving supplemental content from the identified advertiser associated with the one or more terms extracted from the advertisement.

6. The method of claim 5 wherein retrieving supplemental content associated with an advertisement comprises retrieving video content from the advertiser identified as associated with the advertisement.

7. The method of claim 5 wherein retrieving supplemental content associated with an advertisement comprises retrieving audio content from the advertiser identified as associated with the advertisement.

8. The method of claim 5 wherein retrieving supplemental content associated with an advertisement comprises retrieving one or more images from the advertiser identified as associated with the advertisement.

9. The method of claim 5 wherein retrieving supplemental content associated with an advertisement comprises retrieving textual content from the advertiser identified as associated with the advertisement.

10. The method of claim 5 wherein generating a display comprises combining the given one of the one or more advertisements and the supplemental content associated with the given one of the one or more advertisements from the advertiser identified as associated with the advertisement.

11. The method of claim 10 wherein combining an advertisement with supplemental content associated with the advertisement comprises:
   generating a link to the supplemental content associated with the advertisement; and
   displaying the advertisement in conjunction with the generated link.

12. The method of claim 10 wherein combining an advertisement with supplemental content associated with the advertisement comprises generating a pop-up containing the supplemental content associated with the advertisement.

13. The method of claim 10 wherein combining an advertisement with supplemental content associated with the advertisement comprises generating a modified advertisement containing the advertisement and the supplemental content associated with the advertisement.

14. A system for identifying and displaying supplemental content associated with one or more advertisements responsive to a user query, the system comprising:
   an extraction component, wherein the extraction component comprises one or more processing elements operative to analyze a given one of the one or more advertisements, and extract one or more terms from display content of the given one of the one or more advertisements, the given one of the one or more advertisements, from which the one or more terms are extracted, being capable of being displayed in a search results display responsive the user query;
   a search component, wherein the search component comprises one or more processing elements operative to generate a supplemental query using the one or more terms extracted from the given one of the one or more advertisements and identify supplemental content from an advertiser of the given one of the one or more advertisements responsive to the supplemental query, the supplemental content associated with the one or more terms extracted from the given one of the one or more advertisements identified as responsive to the user query and including additional advertising content available from the advertiser of the given one of the one or more advertisements for a limited time period and based on a context of a querying user;
   a supplemental data store component, wherein the advertiser associated with supplemental content may specify the one or more terms in response to which the supplemental content is to be displayed; and
   a display component, wherein the display component comprises one or more processing elements operative to generate a search results display comprising a listing of search results responsive to the query, the given one of the one or more advertisements identified as responsive to a user query and the supplemental content associated with the given one of the one or more advertisements, the supplemental content being visible to the querying user upon a mouse over of the given one of the one or more advertisements, a selection of the given one of the one or more advertisements, or an inactivity of the querying user.

15. The system of claim 14 wherein the extraction component is operative to extract one or more terms from text contained within an advertisement.

16. The system of claim 14 wherein the extraction component is operative to extract one or more terms associated with video content contained within an advertisement.

17. The system of claim 14 wherein the extraction component is operative to extract one or more terms associated with audio content contained within an advertisement.

18. The system of claim 14 wherein the extraction component is operative to extract one or more terms associated with one or more images contained within an advertisement.

19. The system of claim 14 wherein the extraction component is operative to identify an advertiser associated with a given advertisement.

20. The system of claim 19 wherein the search component is operative to locate supplemental content from the advertiser identified as associated with a given advertisement; and retrieve the supplemental content associated with the one or more terms extracted from the advertisement.

21. The system of claim 14 wherein the display component is operative to combine a given advertisement with supplemental content associated with the advertisement.

22. The system of claim 21 wherein the display component is operative to:
   generate a link to supplemental content associated with a given advertisement; and
   display the advertisement in conjunction with the link to the supplemental content associated with the advertisement.

23. The system of claim 21 wherein the display component is operative to generate a pop-up containing the supplemental content associated with the advertisement.

24. The system of claim 21 wherein the display component is operative to generate a modified advertisement containing the advertisement and the supplemental content associated with the advertisement.

* * * * *